Nov. 16, 1943.　　　　R. D. AMSDEN　　　　2,334,528
ELECTRICAL CONTROL SYSTEM
Filed Sept. 20, 1940

Inventor:
Ralph D. Amsden,
by Harry E. Dunham
His Attorney.

Patented Nov. 16, 1943

2,334,528

UNITED STATES PATENT OFFICE 2,334,528

ELECTRICAL CONTROL SYSTEM

Ralph D. Amsden, Lynn, Mass., assignor to General Electric Company, a corporation of New York Application September 20, 1940, Serial No. 357,595

13 Claims. (Cl. 171—97)

My invention relates to electrical control systems, and more particularly to improvements in the automatic control of electrical energy supply sources of the type that are provided with an auxiliary storage battery, which supplies current to the load in certain instances, and which is charged by the system when the main source of current supply is available.

In many cases it is extremely important that a dependable source of current for a load be available at all times. For example, emergency lighting systems for theatres or school buildings require current sources of this type. In such systems the main source of current is usually an ordinary 110 volt alternating current supply, such as is customarily employed in a house lighting circuit, which is associated with a storage battery provided as a stand-by or auxiliary source of current supply in order to secure utmost reliability. The battery is maintained in charged condition by the alternating current supply through a suitable control and rectifying system.

In accordance with my invention I provide an improved control in a system of this type which is so arranged that the charging current through the battery is automatically regulated to maintain the battery in fully charged condition irrespective of fluctuations in the supply current.

It is an object of my invention to provide a new and improved electrical control system.

It is another object of my invention to provide a new and improved control system which is provided with a storage battery as an auxiliary source of current supply.

It is a further object of my invention to provide a new and improved system for maintaining the battery in charged condition, the system being one which employs two rectifiers, one rectifier being designed to supply automatically the necessary power to the load, in addition to a constant charge to the battery somewhat lower than that required to maintain the battery at full charge, the other rectifier being designed to supply the remaining increment of charging current to the battery under the control of conditions of the battery.

Figure 1:
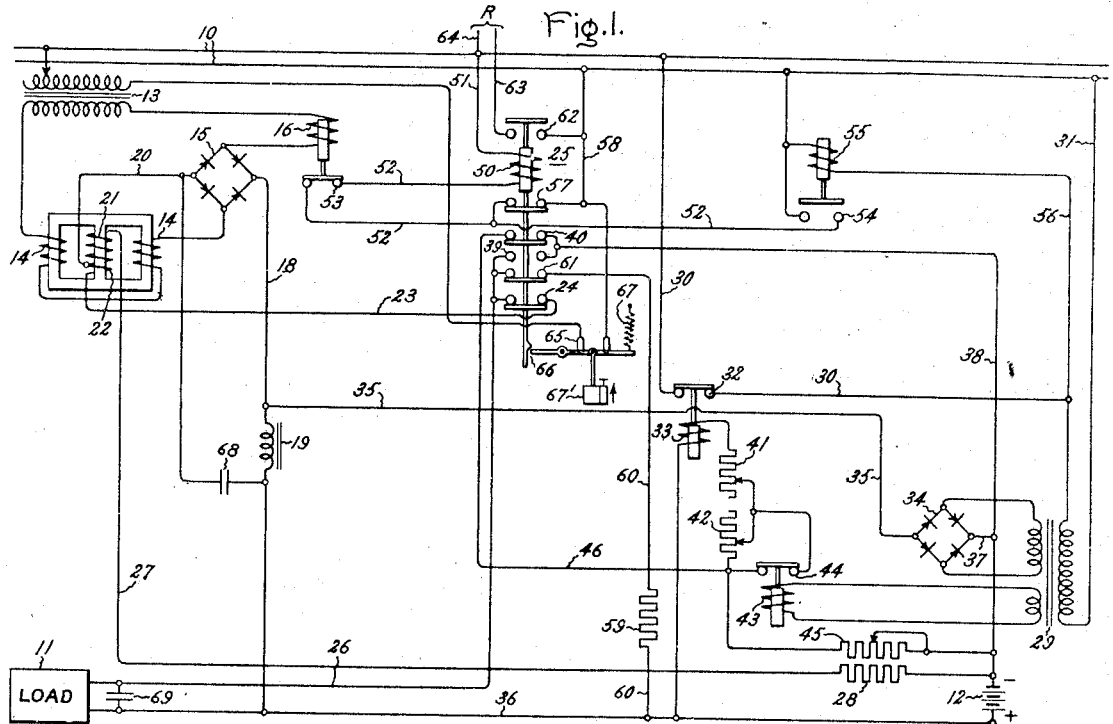
Figure 2:
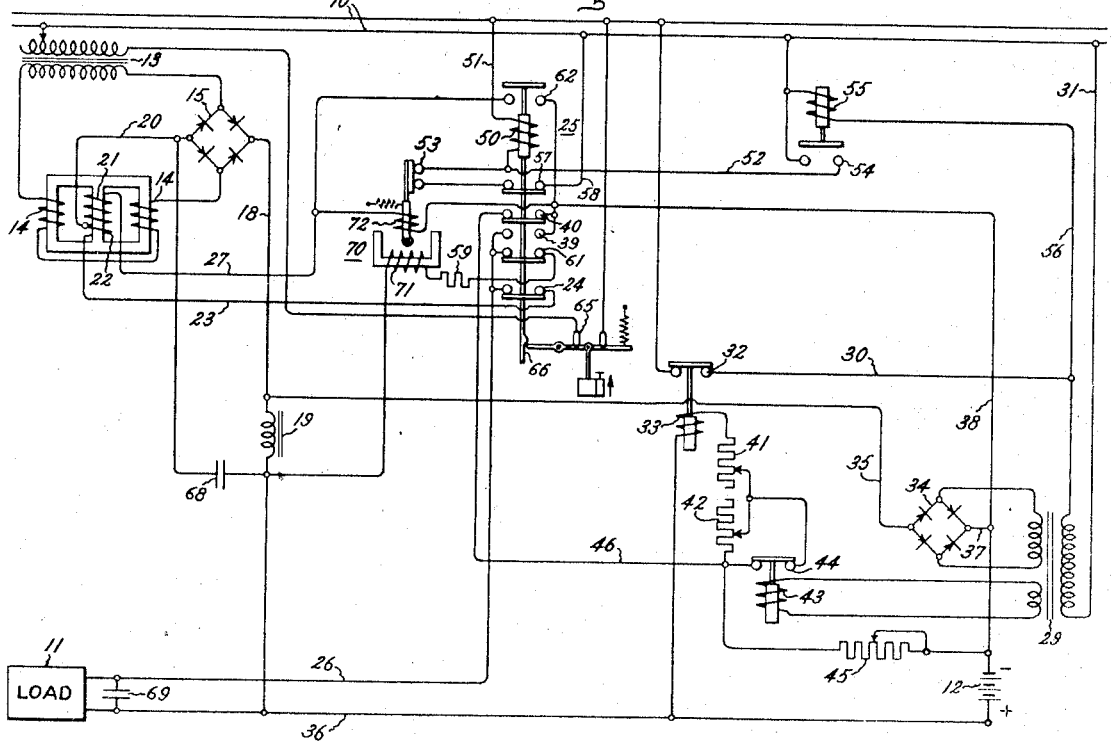

In the accompanying drawing Fig. 1 is a diagrammatic view of a control system constructed in accordance with my invention which employs dual rectifiers to supply the load and to maintain the auxiliary battery in fully charged condition, and Fig. 2 is a modification of the circuit shown in Fig. 1 in which a slightly different form of control means is employed.

Referring to the drawing, I have shown a suitable source of alternating current 10 which is adapted to supply direct current to a load 11 through a suitable rectifier circuit to be described hereinafter. As an auxiliary source of power, a battery 12 is likewise connected to the load 11, the arrangement being such that upon failure of the main source of supply constituting the alternating supply line 10 the battery will be connected into the circuit to supply current to the load 11. During normal operation of the circuit, the major portion of the rectified current is supplied directly to the load 11; at the same time, a separate portion of the current is diverted to the battery 12 to maintain the battery in fully charged condition. After a power failure the automatic control means provides for charging of the battery 12 at an increased rate, which may be called a "boost" charge, to restore the battery quickly to fully charged condition; as soon as this condition is reached the system is restored to normal automatic operation during which a continuous charging current is supplied to the storage battery.

As aforementioned, my system employs two separate charger or rectifying mechanisms. The first, which may be termed the main charger, supplies the requirements of the load directly and, in addition, supplies continuously the major portion of the current required to maintain battery 12 in fully charged condition. The second, which may be termed the auxiliary charger, supplies the final increment of current necessary to maintain the battery 12 in fully charged condition, this final current being regulated within close limits in accordance with the voltage and temperature of the battery.

Turning now to the structure of the main charger, this may be of the type disclosed in Patent No. 2,082,607, issued to myself on June 1, 1937 and assigned to the same assignee as the instant application. As shown in Fig. 1 of the drawing, current is drawn from the alternating current supply line 10 to a transformer 13 and from the secondary winding of the transformer through a variable impedance winding 14 of a regulating saturable reactor to a full wave rectifier 15 which, by way of example, may be of the copper oxide type. Included in the circuit with the transformer and rectifier is the coil of a relay 16 for a purpose to be described later. One lead 18 of the output circuit of the rectifier is connected directly to the load 11 through the medium of a choke coil 19 which acts as a filter to damp out any pulsations in the current. The other lead 20 in the output circuit of the rectifier is connected to the direct current coil of the saturable reactor. This coil is differentially wound and is provided with an upper coil 21 and a lower coil 22 which buck each other so that the net effect of the direct current coil on the saturable reactor is the difference in the ampere turns existing in the coils 21 and 22. Current from the output circuit of the rectifier flows through the lower coil 22, a line 23, through a normally closed contact 24 of a main contactor 25 and thence through a line 26 to the other side of the load 11. In this manner the rectifier 15 supplies the normal requirements of the load 11. A portion of the current from the supply lead 20 of the rectifier flows through the upper winding 21 thence through a lead 27 and resistance 28 to the minus side of the battery. Since the direct current coil of the saturable reactor is differentially wound, the effect on the reactor is the net differential effect of the ampere turns in the coils 21 and 22, so that the charging current supplied to the battery 12 will be substantially constant irrespective of fluctuations of voltage in the supply line 10 and variations in the normal requirements of the load 11. The operation of a saturable reactor and rectifier of this type is fully described in my aforementioned Patent No. 2,082,607. The arrangement is such that the rectifier 15 supplies all of the normal requirements of the load 11 and, at the same time, supplies a continuous charging current to the battery 12. The system is so designed that this charging current is always somewhat less than that required to maintain the battery at full voltage. The additional increment of charging current required to maintain the battery at peak voltage is supplied by the auxiliary charger now to be described.

The auxiliary charger is similar to that described and claimed in my copending application on Control systems, Serial No. 229,129, filed September 9, 1938, and assigned to the same assignee as the instant application. The charger is provided with a transformer 29 which receives current from the source of alternating current 10 by way of supply lines 30 and 31. Supply of current to the transformer is controlled by contacts 32 in the supply line 30, the contacts 32 being opened and closed by an automatic relay 33 operated in response to the voltage of the battery 12. A portion of the secondary of the transformer 29 is connected directly to a full wave rectifier 34 which may be of the copper oxide type. One of the output leads of the rectifier is connected by a line 35 to the load 11 and the plus side of the battery 12 through the filter 19 and a line 36. The other output lead 37 from the rectifier is connected directly to the minus side of battery 12. Lead 37 from the rectifier is also connected by means of a lead 38 to the normally open contacts 39 and normally closed contacts 40 of the main contactor 25 for a purpose to be described later.

The operation of the rectifier 34 is controlled in accordance with the battery voltage through the medium of the aforementioned automatic relay 33. When the battery voltage rises above a certain point the relay 33 is operated to open the contacts 32 thereby disconnecting the transformer 29 from the alternating current supply line and deenergizing the rectifier 34. Operation of the relay is adjusted by rheostats 41 and 42. The rheostat 41 controls the value of the voltage at which the relay 33 picks up, or opens, while the rheostat 42, in combination with a secondary relay 43, controls the drop-out or closing value of the relay 33. The secondary relay 43 operates contacts 44 connected in shunt circuit relation with the rheostat 42; this relay is supplied with current from a portion of the secondary winding of the transformer 29. The relay 43 is operated by a time delay heater element in addition to being responsive to the ambient temperature of the battery and controls the drop-out and pick-up positions of the automatic relay 33 within very close limits. The structural features of the control system comprising the relay 33, rheostats 41 and 42 and the relay 43 form no part of the present invention and are fully shown and described in my copending application, Serial No. 229,129 aforementioned. A resistor 45 is connected in series with the automatic relay 33 and the battery to give one more sequence of operation to the automatic relay in that when the resistor is in series it raises the cutout point of the automatic relay to give a slight overcharge to the battery. The resistor 45 may be short circuited upon closure of the contacts 40 of the contactor 25 through the medium of the aforementioned lead line 38 and a line 46 extending from the contacts 40 to the resistor.

By the construction described it will be seen that the main rectifier 15 supplies the normal demands of the load 11 and, at the same time, supplies a continuous charging current to the battery 12 which is slightly less than that required to maintain the battery voltage at its proper value. The charging action of the rectifier 34 is supplementary to that of the rectifier 15 and provides the final increment of charge necessary to bring the battery up to full voltage. The auxiliary rectifier 34 is operated in accordance with the voltage of the battery through the medium of relay 33 while the main rectifier 15 operates continuously to supply a trickle charge to the battery irrespective of the load on the line and irrespective of the operation of the auxiliary rectifier 34; this trickle charge is maintained constant by the bucking action of the coils 21 and 22 on the direct current winding of the saturable reactor. In this manner the auxiliary rectifier monitors the continuous charging action of the main rectifier 15.

The contactor 25 is operated by a coil 50 connected across the alternating current supply lines 10 by lead lines 51 and 52. Connected into the lead line 52 are the contacts 53 of the aforementioned relay 16 and likewise the contacts 54 of a relay 55 which is connected across the supply line by a line 56, line 30 and contact 32. The purpose of the relay 55 will be described hereinafter. The contacts 54 in the line 52 are shunted by contacts 57 on the contactor 25 so that current from one side of the supply line 10 may pass through the line 51, coil 50, contacts 53, line 52, contacts 57 and line 58 to the other side of the line. In order to stabilize operation of the system at no load, a resistor 59 is connected across the load 11 by a lead line 60, contacts 61 of the contactor 25 and the aforementioned lead line 26. The operation of the main and auxiliary chargers and the battery will now be described under normal load, under overload, and under emergency conditions.

*Normal operation*

In normal operation power is supplied to the main charger through the closed circuit formed by the secondary of the transformer 13, the coils 14 of the saturable reactor, the rectifier 15, and the coil of the relay 16, which operates as an overload relay. The coil 50 of the main contactor 25 is energized by the supply line so that the contacts 24, 61, 40 and 57 are closed and the contacts 39 and 62 are open, as shown by Fig. 2. The contact 62 controls the supply of current through a line 63 to the input of an additional rectifying mechanism R which is connected to the other side of the supply line by a line 64. The rectifying mechanism R is in addition to that shown by the drawing and may be connected to the battery 12 in any convenient manner by a circuit (not shown). Inasmuch as the contacts 62 are normally open the additional rectifying mechanism R is not utilized during normal operation of the system. This rectifying mechanism is not essential to the operation of the system herein disclosed; if desired it may be entirely omitted.

The rectifier 15 supplies the requirements of the load 11 in the manner aforementioned, one line to the load extending through the filter 19, the other line extending through the lower coil 22 of the direct current winding of the saturable reactor and then through the line 23, closed contacts 24 and line 26 to the load. A continuous trickle charge is also supplied to the battery through the upper half 21 of the saturating winding of the reactor, line 27 and resistor 28 to the minus side of the battery.

The value of the resistor 28 is so chosen with respect to the capacity of the main charger, the size of the battery and the requirements of the load that a continuous trickle charge is provided for the battery irrespective of variations in the voltage of the supply current and in the normal load requirements. Current to the plus side of the battery is obtained through the aforementioned line 18, filter 19 and line 36. Since the requirements of the load vary within normal limits, the coil of relay 16 permits the contacts 53 to remain in closed position, so that the coil 50 of the main contactor 25 is energized by line 51, line 52, contacts 53, closed contacts 57 to the other side of the input line. The contacts 57 form a shunt around the contacts 54 of the relay 55 which may or may not be closed depending upon whether or not the contacts 32 of the relay 33 are closed. Closure of contacts 32 energizes the relay 55 to open the contacts 54. The resistor 59 which stabilizes operation of the main rectifier under no load conditions is connected across the load by the lead line 60, closed contacts 61, and lead line 26.

The auxiliary charger which supplies the final increment of charging current to maintain the battery in fully charged condition may or may not be operating, depending upon the condition of the battery at any particular time. If the battery voltage is low the automatic relay 33 closes the contact 32 supplying current to the primary of the transformer 29. Current is then supplied by the rectifier 34 directly to the battery 12. The points at which the relay 33 opens and closes are adjusted through the resistors 41, 42 in the manner aforementioned and as more particularly described in my copending application, Serial No. 229,129. The relay operates the rectifier 34 to maintain the battery voltage at proper value within very close limits; in this manner the rectifier 34 supplements and monitors the continuous charging output of the main rectifier 15. Inasmuch as the contacts 40 of the main contactor 25 are in closed position, the resistance 45 is short circuited. If the resistance 45 were to remain in the circuit with the automatic relay 33, the voltage at which the contacts 32 open would be raised so that after a severe drain on the battery, such as might occur during an overload or power failure, the battery would be given a slight overcharge.

Overload operation

If an overload is applied to the system additional current passes through the main rectifier 15 and the secondary of the transformer 13 as well as the coil of the overload relay 16, thereby operating this relay to open the contacts 53. This breaks the circuit to the coil 50 of the main contactor 25, causing the contactor to open. When this occurs contacts 39 and 62 close and contacts 24, 61, 40 and 57 are opened. Opening of the main contactor 25 opens the contacts 57 to throw out the holding circuit for the coil through these contacts. Since the contacts 40 are now open, the resistor 45 is placed in series with the other resistances controlling the automatic relay 33, thereby lowering the voltage applied to the relay causing the contacts 32 to close, if they are not already in closed position, and initiating operation of the auxiliary charger to supply current to the battery 12. Closure of contacts 32 likewise causes operation of relay 55 to open the contacts 54 in the line 52 supplying current to the holding coil of the main contactor 25. Opening of contacts 61 of the main contactor opens the circuit to the stabilizing resistor 59 which is normally placed across the load 11. Opening of the contacts 24 of the main contactor 25 breaks the circuit of the rectified current through the lower coil 22 to the load 11 thereby destroying the differential control of the windings 21 and 22 of the saturable reactor, so that the reactor is saturated and a maximum voltage applied to the rectifier. The output of the rectifier now passes to the load through the upper winding 21, line 27 and resistance 28, which is the normal path taken by the trickle charge to the battery, line 38, closed contacts 39 and line 26; closure of contacts 39 likewise throws the battery across the load. The contacts 62 are also now in closed position so that current from the supply line 10 is supplied to the additional rectifying mechanism R to supply additional current to the load or battery as the case may be in those situations where the additional rectifier is employed. When the contactor 25 opens, contacts 65 of the contactor remain in closed position due to a lost motion connection 66 between the operating mechanism of the main contactor 25 and the contacts 65. This means that power is still supplied to the primary of the transformer 13 so that the main charger continues to supply the requirements of the overload. It will thus be seen that upon overload the main charger is operating at full capacity at an increased or "boost" rate to supply the requirements of the overload, since the differential control of the reactor coils 21 and 22 has been removed. At the same time, the auxiliary charger is operating continuously to supply the needs of the battery 12. If the need of the overload is large enough current may also be taken from the battery 12 to supplement that received from the main charger.

Upon removal of the overload, the overload relay 16 closes the contacts 53 but the coil 50 of the main contactor 25 remains deenergized due to the fact that both the contacts 57 and 54 are in open position. This means that the main contactor 25 remains in open position and the main charger and auxiliary charger continue to operate at their "boost" rates until the battery 12 is fully charged. In other words, immediately after overloads the differential control of the coils 21 and 22 of the saturable reactor is not employed to control the output of the main rectifier 15, since the contacts 24 are in open position so that the full output of the rectifier 15 is utilized to supply the requirements of a normal load as well as assist in replacing the charge in the battery 12 along with the output of the auxiliary rectifier 34. Since the contacts 40 are open the resistance 45 is in series with the relay 33 raising the voltage in the battery necessary to operate the relay and thereby causing a slight overcharge to be placed in the battery.

When the voltage of the battery 12 reaches the point equivalent to a slight overcharge the automatic relay 33 picks up opening the contacts 32. This breaks the circuit to the coil of the relay 55 and permits the contacts 54 to return to closed position. Upon closure of contacts 54 the coil 50 of the main contact 25 is energized closing its contactor causing the contacts 24, 61, 40 and 57 to return to closed position and the contacts 39 and 62 to return to open position. This means that the main charger is thrown on to its normal operation under the control of the differential coils 21 and 22 in which it supplies the requirements of the load 11 and, in addition, maintains a continuous trickle charge to the battery 12. At the same time, the auxiliary charger continues to operate in response to the voltage of the battery through the control of the automatic relay 33.

The main charger is not immediately thrown into normal operation since provision must be made to permit the large flux in the core of the saturable reactor to collapse before returning the reactor to the differential control of the windings 21 and 22. To this end, the contacts 65 are momentarily opened during closure of the main contactor 25 by the lost motion connection 66 so that the current supply to the primary of the transformer 13 is interrupted permitting the magnetic flux in the reactor to collapse. The contacts 65 are reclosed after a predetermined time, for example, one-half second, by a spring 67 acting against a dashpot 67', so that the main charger is immediately thrown into normal operation. During the momentary period when the main charger is inoperative current to the load is supplied by the battery 12. The battery is well able to supply this current since it has been slightly overcharged during the period in which the chargers operated at their boost rate. The contacts 65 are momentarily opened and closed before contacts 39 open so that the battery supplies the load through line 38, contacts 39 and line 26.

It will be apparent that the contacts 57 are necessary to form a holding circuit for the main coil 50 around the contacts 54 because the latter contacts may be opened or closed depending upon the operation of the relay 55 under the control of the automatic relay 33 of the auxiliary charger; the latter relay is operated in accordance with fluctuations in voltages of the battery. Were it not for the holding contacts 57, every time the contacts 54 operated in response to the operation of the auxiliary charger, the main contactor 25 would be thrown over into overload operation.

*Emergency operation*

Upon failure of the current supply source the primaries of the transformers 13 and 29 become deenergized and likewise the coil 50 of the main contactor 25. This stops the operation of both the main and auxiliary charges and likewise causes the main contactor 25 to open. This throws the load over on the battery 12 because the contacts 39 are moved to closed position. If the power failure was of relatively short duration, the voltage of the battery 12 will not have decreased materially so that the automatic relay 33 will not have moved to a position to close the contacts 32. This means that the contacts 54 will have remained in closed position and as soon as the power comes on the coil 50 of the main contactor will be energized, thereby closing the contactor and restoring the main and auxiliary chargers to normal operation. However, if the power failure has occurred for a relatively long period of time, then the voltage of the battery 12 will have decreased to a point to operate the automatic relay 33 and thereby close the contacts 32. When the power comes on the relay 55 is immediately energized and having a higher speed than that of the main contactor 25 opens the contacts 54 before the main coil 50 of the contactor can be energized to close the main contactor. This means that the main charger is thrown into "boost" operation, such as is the case when an overload occurs on the system, so that the differential control of the windings 21 and 22 is ineffective thereby supplying the full output of the rectifier 15 to the battery 12 and the requirements of the load. In this manner the battery is fully recharged after a long failure in the current supply. Upon recharge of the battery the automatic relay 33 is operated to open the contacts 32 and thereby deenergize the coil of the relay 55 permitting the contacts 54 to close and throwing the contactor 25 to closed position, thereby returning the main charger to normal operation.

By my construction it will be seen that during the periods of normal load the main charger supplies the requirements of the load through the differential control of the rectifier 15 and, in addition, provides a continuous trickle charge to the battery 12 which is somewhat lower than the requirements of the battery to maintain it at full voltage. The additional increment of charge necessary to maintain the battery at full voltage is supplied intermittently by the auxiliary charger in response to control of the automatic relay 33. Under conditions of overload the differential control of the main charger is rendered ineffective so that the full output of the rectifier 15 is supplied to meet the needs of the overload as well as supply any additional current to the battery 12, in case the requirements of the overload makes demands on the battery. After removal of the overload the full or "boost" output of the rectifier 15 is maintained, as well as that of the rectifier 34, until the battery 12 is brought back to a condition of full charge. At this point, due to the fact that the resistance 45 is placed in series with the automatic relay 33 during the period of overload and "boost" charge the battery is given a slight overcharge to supply current during the momentary interval during which the flux in the saturable reactor is allowed to collapse. In case of power failure the system is immediately thrown into operation to connect the battery 12 to the load. In case the failure of power is for a relatively short duration the system is immediately thrown back into normal operation, whereas in case the failure of power is for a relatively long period, the system is thrown into overload or "boost" operation upon resumption of power until such time as the battery 12 has been restored to normal condition.

Any ripples in the output current of the rectifier 15 are dampened by the choke coil 19 and are in addition by-passed by a condenser 68 connected across the output leads of the rectifier 15. An additional safeguard in damping out any ripples in the direct current supplied to the load 11 is provided for by the condenser 69 connected across the load line.

Fig. 2 of the drawing illustrates a modification of my invention in which a reverse current relay replaces the overload relay 16 to secure a more uniform and reliable operation of the system under conditions of overload. Otherwise the arrangement of the elements in the system is substantially the same as the arrangement shown by Fig. 1. In place of the overload relay 16 a reverse current relay 70 is provided with the potential coil 71 in series with the resistance 59 and connected across the load. The current coil 72 of the reverse current relay is included in the trickle charge circuit of the main charger so that it is connected to the minus side of the battery by the line 38 and likewise to the coil 21 of the saturable reactor by the line 27. The resistance 28 in the line 27, in the form of the invention shown by Fig. 1, is replaced by the resistance of the current coil 72. Under certain conditions to be described latter the current coil 72 is shorted out of the circuit whenever the contacts 62 of the main contactor 25 are closed. In the form of the invention shown by Fig. 2 the additional rectifying mechanism R is omitted and is not controlled by the contacts 62. The contacts 53 which control the current to the main coil 50 of the contactor 25 are operated by the reverse current relay, in the form of the invention shown by Fig. 2 rather than by the overload relay 16, as shown by Fig. 1. Otherwise, the operation of the circuit of Fig. 2 is substantially the same as that of Fig. 1.

In normal automatic operation, current from the rectifier 15 passes from one terminal through the line 18, the filter choke 19 to one side of the load line 36. Current from the other output terminal of the rectifier passes to the differential winding of the saturable reactor. The load portion of the current passing through the lower winding 22, line 23, closed contacts 24, line 26 to the load 11. The battery charging portion of the current passes through the upper coil 21, line 27 through the potential coil 72 of the reverse current relay to the minus side of the battery by line 38. This flow of current through the coil 72 maintains the contacts 53 in closed position so that the holding coil 50 maintains the contactor 25 in closed position, current passing to the holding coil from one side of the supply line through the closed contacts 57 and 53 to the other side. The auxiliary charger supplies current from the rectifier 34 under the control of the automatic relay 33 to maintain the battery in fully charged condition, the same as in the arrangement shown by Fig. 1.

Upon the application of an overload the trickle charging current passing through current coil 72 decreases as a result of the action of the differential windings 21 and 22 of the saturable reactor so that the voltage through the line is reduced; inasmuch as the battery has been maintained in a fully charged position by the auxiliary charger the battery pumps back through the line 38 and the coil 72 of the reverse current relay thereby opening the contacts 53. When this occurs the holding coil 50 of the main contactor is deenergized to open the contactor 25. This closes the contacts 62 on the main contactor so that the main charger operates at its maximum capacity and current from the rectifier 15 flows through the upper coil 21, lead line 27, around the current coil 72 through the closed contacts 62 to the minus side of the battery and through the closed contacts 39, line 26 to the load. In this manner the main charger meets the full requirements of the load, any excess current being applied to charging the battery 12. During overload the auxiliary charger operates in response to the voltage on the battery under the control of the automatic relay 33 in the same manner as the structure described in Fig. 1.

Upon return of the system from an overload to a normal condition the system returns to either an automatic operation or to a "boost" operation in the same manner as the structure shown by Fig. 1 depending upon whether or not the overload has continued, for a relatively short or a relatively long period of time. In case the voltage of the battery has been lowered due to a prolonged overload, the contacts 32 of the automatic relay 33 will be closed so that the contacts 54 of the relay 55 will be in open position. This means that the system will continue to operate at a "boost" charging rate to bring the voltage of the battery up to normal. When this occurs the contacts 32 open, thereby deenergizing the coil of relay 55 and closing the contacts 54 so that current is once more applied to the holding coil 50 of the main contactor, thereby causing the contacts to close. This opens up the shorting contacts 62 around the current coil 72 of the reverse current relay, so that the trickle charging current from the main rectifier 15 passes through the coil 72 closing the contacts 53 thereby completing the holding circuit through the contacts 57 around the relay 55 and contacts 54.

The emergency operation of the system is the same as that described in connection with Fig. 1 in that upon failure of power the transformers 13 and 29 are deenergized as well as the holding coil 50 of the contactor, so that the latter is moved to open position. This permits the battery to be connected directly to the load through the line 27, closed contacts 39 and line 26. Upon resumption of power, the system returns either to normal or "boost" operation depending upon whether the failure of power occurred for a short or long interval.

What I claim as new and desire to secure by Letters Patent of the United States is:

1. A control system for supplying direct current to a load circuit and battery from a source of alternating current comprising, in combination, a charger operatively connected to the supply circuit for supplying battery charging and load currents, differentially acting means responsive respectively to the battery charging current and load current for similarly controlling the voltage applied by the charger to the load circuit and battery so as to maintain said battery current less than the normal charging requirements of the battery, and means responsive to an overload on the load circuit for modifying the control of said differentially acting means whereby the maximum output of said charger is supplied to the load and battery.

2. A control system for supplying direct current to a load circuit and battery from a source of alternating current comprising, in combination, a charger operatively connected to the supply circuit for supplying battery charging and load currents, differentially acting means responsive respectively to the battery charging current and load current for similarly controlling the voltage applied by the charger to the load circuit and battery so as to maintain said battery current less than the normal charging requirements of the battery, means responsive to an overload on the load circuit for modifying the control of said differentially acting means whereby the maximum output of said charger is supplied to the load and battery, and an auxiliary charger operatively connected to the supply circuit and being operated independently of the load but in response to the voltage of said battery for supplying additional charging current to the battery to make the normal charging requirements of said battery.

3. A control system for supplying direct current to a load and battery from a source of alternating current comprising, in combination, a rectifier operatively connected to the current source for supplying battery charging and load currents, means responsive to the battery charging and load currents for controlling the operation of said rectifier whereby said rectifier supplies the normal load requirements through one circuit and a charging current to the battery through another circuit, means responsive to an overload for rendering ineffective said control means whereby the maximum output of said rectifier is supplied to the load and battery through said other circuit, and means responsive to the voltage of said battery for restoring the effectiveness of said control means upon return to normal load.

4. A control system for supplying direct current to a load and battery from a source of alternating current comprising, in combination, a main rectifier operatively connected to the supply circuit for supplying battery charging and load current, means responsive to the battery charging and load currents for controlling the operation of said rectifier whereby said rectifier supplies the normal load requirements through one circuit and a charging current to the battery through another circuit less than the normal charging requirements of the battery, means responsive to an overload for rendering ineffective said control means whereby the maximum output of said main rectifier is supplied to the load and battery through said other circuit, an auxiliary rectifier operatively connected to the supply circuit and being operated independently of the load but in response to the voltage of said battery for supplying an additional increment of battery charging current to fulfill the normal charging requirements of the battery, and means responsive to the voltage of said battery for restoring effectiveness of said control means upon return to normal load.

5. A control system for supplying direct current to a load and battery from a source of alternating current comprising, in combination, a charger operatively connected to the supply circuit for supplying battery charging and load current, means responsive to the battery charging and load currents for controlling the operation of said charger whereby said charger supplies the normal load requirements through one circuit and a charging current to the battery through another circuit less than the normal charging requirements of the battery, means responsive to an overload for rendering ineffective said control means whereby the maximum output of said charger is supplied to the load and battery through said other circuit, and means acting upon return to normal load and being responsive to the voltage of the battery for maintaining said charger at maximum ouput until the battery is fully charged.

6. A control system for supplying direct current to a load and battery from a source of alternating current comprising, in combination, a main rectifier operatively connected to the supply current, means responsive to the battery charging and load currents for controlling the operation of said rectifier whereby said rectifier supplies the normal load requirements through one circuit and a charging current to the battery through another circuit less than the normal charging requirements of the battery, a second rectifier operatively connected to the supply circuit and being operated independently of the load but in response to the voltage of the battery for supplying an additional increment of battery charging current to fulfill the normal charging requirements of the battery, means responsive to an overload for rendering ineffective said control means whereby the maximum output of said main rectifier is supplied to the load through said other circuit, and means acting upon return to normal load and being responsive to the voltage of said battery for maintaining the maximum charging output of said main and second rectifiers to fully charge said battery.

7. In a system for supplying a direct current load from a source of alternating current comprising, in combination, a battery, a charger for said battery, a relay responsive to the battery voltage controlling the operation of said charger for maintaining said battery in fully charged condition, means responsive to failure of the current source to connect said battery to the load, an impedance, and means responsive to restoration of the current supply for connecting said impedance in circuit with said relay to provide an overcharge of said battery.

8. In a system for supplying a direct current load from a source of alternating current, a battery, a charger for said battery, said charger being provided with control means responsive to the voltage of said battery for maintaining said battery in fully charged condition, means responsive to failure of the current source for connecting said battery to the load, means responsive to restoration of the supply current for adjusting said control means to provide an overcharge of said battery, and means responsive to the overcharge in said battery to render said adjusting means ineffective and to return said control means to normal operation.

9. In a system for supplying a direct current load from a source of alternating current comprising, in combination, a battery, a charger for said battery, said charger being provided with control means responsive to the voltage of said battery for maintaining said battery in fully charged condition, means responsive to an overload on said system to connect said battery to the load, means responsive to restoration of normal load to said system for adjusting said control means to provide an overcharge of said battery, and means responsive to the overcharge of said battery to render said adjusting means ineffective to return said control means to normal operation.

10. A control system for supplying direct current to a load and battery from a source of alternating current comprising, in combination, a main charger operatively connected to the supply circuit for supplying battery charging and load currents, means responsive to the battery charging and load currents for controlling the operation of said charger whereby said charger supplies the normal load requirements through one circuit and charging current to the battery through another circuit less than the normal charging requirements of the battery, a second charger operatively connected to the supply circuit and being operated independently of the load on the system but in response to the voltage of said battery for supplying an additional increment of battery charging current to fulfill the normal charging requirements of the battery, means responsive to an overload on the system for rendering ineffective said controlling means whereby the maximum output of said main charger is supplied to the load and battery through said other circuit, and means responsive to the voltage of said battery in fully charged condition for restoring the control of said means to return said main charger to normal operation, said last-mentioned means stopping the operation of said second charger.

11. A control system for supplying direct current to a load and battery from a source of alternating current comprising, in combination, a main charger operatively connected to the supply circuit for supplying battery charging and load currents, means responsive to the battery charging and load currents for controlling the operation of said charger whereby said charger supplies the normal load requirements through one circuit and a charging current to said battery through another circuit less than the normal charging requirements of the battery, a second charger operatively connected to the supply circuit and being operated independently of the load on the system for supplying an additional increment of battery charging current to fulfill the normal requirements of the battery, means responsive to failure of said current supply for placing the battery in circuit with the load, means acting on restoration of the current supply for rendering ineffective said control means whereby the maximum output of said main charger is supplied to the load and battery through said other circuit, and means responsive to the voltage of said battery for restoring the effectiveness of said control means upon a fully charged condition of the battery.

12. A control system for supplying direct current to a load and battery from a source of alternating current comprising, in combination, a charging mechanism including a rectifier operatively connected to the supply circuit for supplying battery charging and load currents, means responsive to the battery charging and load currents for controlling the operation of said charger whereby said charger supplies the normal load requirements through one circuit and a charging current to the battery through another circuit less than the normal charging requirements of the battery, and means including an overload switch in the input circuit of the rectifier for rendering ineffective said control means whereby the maximum output of said charger is supplied to the load through said other circuit.

13. A control system for supplying direct current to a load and battery from a source of alternating current comprising, in combination, a rectifier operatively connected to the supply circuit for supplying battery charging and load currents, differentially acting means responsive respectively to the battery charging and load currents for controlling the operation of said rectifier so that the voltage applied to the load and battery is such as to maintain said battery charging current less than the normal charging requirements of the battery, and a reverse current relay operated by said differentially acting means to so modify said differentially acting means that the maximum current of said charger is applied to the load and battery.

RALPH D. AMSDEN.